BIASING ARRANGEMENT FOR PULSE CODE MODULATION SAMPLING CIRCUITS
Filed Feb. 23, 1967
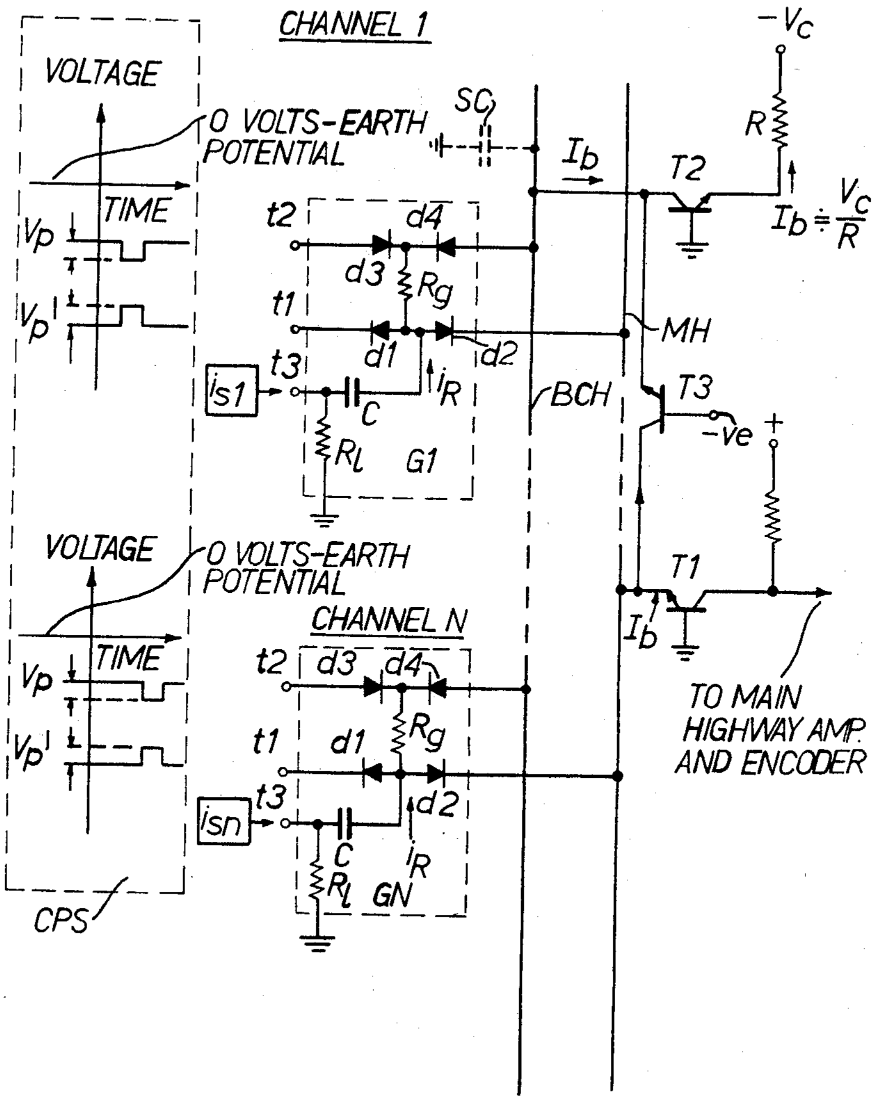

3,503,013

BIASING ARRANGEMENT FOR PULSE CODE MODULATION SAMPLING CIRCUITS

Keith George Warren, London, England, assignor to Associated Electrical Industries Limited, London, England, a British company Filed Feb. 23, 1967, Ser. No. 618,128
Claims priority, application Great Britain, Mar. 11, 1966, 10,828/66
Int. Cl. H03k 17/74, 3/31
U.S. Cl. 332—11 4 Claims

ABSTRACT OF THE DISCLOSURE

In a pulse code modulation system, a circuit arrangement in which each of a plurality of channel sampling gates arranged to be opened successively by means of channel pulses, is connected between a signal bus and a bias current bus, each gate when open allowing bias current to pass through it between the buses and including a circuit for superimposing on the bias current with an electrical waveform signal.

Background of the invention

This invention relates to circuit arrangements for sampling electrical waveforms and has a particular but non-exclusive application to pulse code modulation (P.C.M.) systems.

In a multi-channel companded P.C.M. system it is desirable that the respective D.C. operating levels (pedestals) of a plurality of channel sampling gates should be as nearly the same as possible so that the D.C. operating levels are closely centred on the input characteristic of an encoder to which the channels have common access, one at a time, over a main bus. For instance, any vibration in the D.C. operating level from a nominal level should be only of the same order as the smallest quantum step used in the system. To achieve this, there is known a circuit arrangement for sampling electrical wave-forms, in which each of a plurality of channel sampling gates is arranged, when given access to the main bus, to draw bias current from the main bus by means of a so-called current steering techniques which involves "steering" the bias current from the main bus into a termination in each channel sampling gate in turn during the relevant channel period, the steered bias current having a level determined by the termination and being amplitude modulated by signal current within the gate. However, this known circuit arrangement has the disadvantage that the level of bias current "steered" into each channel sampling gate is dependent inter alia upon the characteristics of the circuit components which comprise the gate so that unless circuit components having close tolerances, which tend to be costly, are used for all the sampling gates, the "steered" bias current may vary in level from gate to gate by an extent greater than the permitted difference, having regard to the input characteristic of the encoder, between the respective D.C. operating levels of the gates.

The present invention seeks to overcome this disadvantage by making the level of the bias current less dependent on the tolerances, within practical limits, of the circuit components comprising the sampling gates, so that it becomes possible to use for the sampling gates circuit components which have wider tolerances and are thus cheaper than the circuit components used hitherto.

Summary of the invention

According to the present invention there is provided a circuit arrangement for sampling electrical waveforms in which each of a plurality of sampling gates is connected across a main (signal) bus and a bias current bus, which latter is terminated in, or otherwise has connected to it, means for determining a selected level of bias current, and in which each sampling gate is arranged so as when open to pass bias current through itself between said buses and includes means for applying to bias current passing through it an electrical waveform signal for amplitude modulating such bias current.

Thus, in an arrangement according to the invention, the bias current is not steered into a separate termination, which determines its level, in each opened sampling gate, as in the known arrangement discussed above, but instead is steered through each sampling gate and has its level determined in respect of all the gates by said means terminating or otherwise connected to the bias current bus.

Brief description of the drawing

In order that the invention may be more fully understood reference will now be made by way of example to the accompanying drawing, the single figure of which shows one embodiment of a circuit arrangement according to the invention for sampling electrical waveforms.

Description of the preferred embodiment

Referring to the drawing, the circuit arrangement there shown is provided in a multi-channel companded P.C.M. system and comprises a plurality of channel sampling gates G1 to GN which pertain reespectively to the channels of the system. Only the first gate G1 and the last gate GN are shown in the drawing. Each of the channel sampling gates G1 to GN is connected between a main (signal) bus MH and a bias current bus BCH. The main bus MH is connected via a transistor T1 to a main amplifier and encoder (not shown) of the P.C.M. system, and the bias current bus is connected via a transistor T2 and a resistor R to a negative supply voltage terminal $-V_c$.

The principle of operation of the current arrangement is to "steer" bias current $I_b$ through each of the channel sampling gates G1 to GN in turn, by opening the gates in turn, so that the bias current $I_b$ flows between the main bus MH and the bias current bus BCH through each gate during the time the latter is open. Each of the channel sampling gates G1 to GN comprises four diodes *d*1 to *d*4 and a resister $R_g$ connected as shown between two pulse input terminals *t*1 and *t*2 and the two buses MH and BCH. Normally, the diodes *d*1 and *d*3 are biased into conduction by potentials applied to the terminals *t*1 and *t*2 from a channel pulse source CPS of the system. The resultant current flow through resistor $R_g$ produces at the junction of the diodes *d*1 and *d*2 and at the junction of the diodes *d*3 and *d*4 respective potentials which back-off the diodes *d*2 and *d*4, so that these latter two diodes are non-conducting. This corresponds to the closed condition of a channel sampling gate in which no bias current $I_b$ can flow through the gate between the two buses MH and BCH. To open a channel sampling gate, the relevant channel pulse is applied simultaneously but with opposite polarity to the two pulse input terminals *t*1 and *t*2. This pulse is effective to back-off the diodes *d*1 and *d*3 with the result that the other two diodes *d*2 and *d*4 are no longer backed-off and are instead allowed to pass bias current $I_b$ through the gate between the two buses MH and BCH. Each of the channel sampling gates G1 to GN also has a signal input terminal *t*3, and an electrical waveform signal derived from a respective one of signal current sources $i_{s1}$–$i_{sn}$ is applied to this terminal and passes via a capacitor C in the gate to combine with the bias current $I_b$ flowing through the gate. These signal current sources are of high impedance.

In the circuit arrangement described above, the value of the bias current $I_b$ is determined by $V_c/R$, and it has been found that the arrangement allows the bias current to vary by only up to 0.1% of its nominal value from channel to channel using resistors with 1% tolerances and relatively low voltages. This is because the selected value of bias current as "steered" through the channel sampling gates is necessarily the same for all channels, apart from the small portion of the bias current which is lost in charging capacitor C through resistor $R_1$. However, by making the value of resistor $R_1$ large, this loss can be kept down to about 5 of the smallest quantum steps in magnitude, and the differential loss between channels can be made a fraction of one quantum step by keeping a fairly tight tolerance (i.e., within 1%) on the value of resistor $R_1$ and on the magnitude (e.g., within 5%) of the negative version of the channel pulse at terminal $t2$. The resistor $R_g$ in each of the channel sampling gates G1 to GN does not materially influence the value of the bias current $I_b$ and, in principle, can be arbitrarily chosen as its only function is to couple together the two sides of the gate. The value of signal current drawn from the main bus when a channel sampling gate is open is $I_b - i_R + i_s$. Since $I_b$ is the same for all channels and $i_R = V_p/R_1$, where $V_p$, the magnitude of the channel pulse, is kept to within 5% of the nominal value and the value of resistor $R_1$ is kept to within 1% of its nominal value as aforesaid, virtually the same value of current is drawn by each channel from the buses so that voltages present at points on the two buses hardly change in value on switching from channel to channel. Thus the switching can be made very rapid and bus capacitance is of little consequence. The positive and negative versions $V_p'$ and $V_p$ of the channel pulses need not be of the same magnitude.

If a number of channel sampling gates are connected to the bias current bus BCH a considerable stray capacitance to earth may exist as indicated by the dotted line capacitance SC. Also, due to switching imperfections, it may be possible for the switching of the channel sampling gates to overlap so that at least for part of a channel time period, two gates can be switched on together. During such overlap, the bias current in the bias current bus BCH divides between the two gates. Since the current through transistor T2 is fixed at $I_b$, the stray capacitance becomes charged. During this charging and the subsequent discharging of the stray capacitance, the potential of the bias current bus BCH and the current in the resistors $R_g$ vary, and the total bias current level differs from $I_b$ until the stray capacitance has discharged. To avoid the possibility of the bias current varying in this way, the circuit arrangement shown in the drawing also includes a transistor T3 having its emitter-collector path connected between the bias current bus BCH and the main bus MH. The base of the transistor T3 is connected to a fixed negative potential and the emitter-collector path of this transistor conducts a portion of the constant current $I_b$ between the bias current bus BCH and the main bus MH such as to tend to maintain a constant potential on the bias current bus BCH. The emitter of transistor T3 thus presents a low impedance to the bias current bus BCH so that difficulties due to stray capacitance are avoided, but there is now a substantially fixed potential between the bias current bus BCH and the main bus MH. Thus variations in the values of the resistance $R_g$ in the different gates results in variations in the current flow through them. However, the current flow in transistor T1 is held constant at $I_b$ for each gate, i.e. the bias pedestal in the output to the main amplifier and encoder has a constant amplitude for each gate and the variations in current through the resistance $R_g$ in the different gates, is taken up by variations of current in transistor T3.

I claim:

1. A circuit arrangement for sampling electrical waveforms comprising a bias current bus, means for supplying a substantial constant bias current to said bias current bus, an output current bus, a plurality of sampling gates each having a bias current input, a signal current input and an output point, means for connecting the bias current inputs of said gates to said bias current bus, means for connecting the output points of said gates to said output current bus, a like plurality of input current paths, means for connecting said input current paths to the signal current inputs of respective ones of said gates, and biasing means for electrically biasing each of said gates into the open state thereof, in turn, during successive sampling intervals so that a current is applied to said output current bus during any sampling interval which substantially corresponds to the algebraic sum of the bias current and the signal current flowing in the respective input path.

2. A circuit arrangement in accordance with claim 1 wherein each said sampling gate comprises a first semiconductor diode, a resistor and a second semiconductor diode connected in series in that order between said bias current input and said output point, the anode of said first diode and the cathode of said second diode respectively being connected to said resistor, and means for connecting the signal current input to the junction between one of said diodes and said resistor.

3. A circuit arrangement in accordance with claim 2 wherein said biasing means includes third and fourth semiconductor diodes, the anode of the third diode being connected to the anode of the first diode and the cathode of the fourth diode being connected to the cathode of the second diode, and means for normally applying a forward bias between the cathode of the third diode and the anode of the fourth diode such as to reverse bias the first and second diodes and for applying, during the respective sampling period, a sampling pulse to reverse bias said third and fourth diodes to permit the gate to open to permit passage of bias and signal currents.

4. A circuit arrangement in accordance with claim 2 wherein a substantially constant voltage network is connected between the bias current bus and the output current bus, said network comprising the emitter-collector path of a transistor, the base electrode of said transistor being maintained at a constant potential.

References Cited

UNITED STATES PATENTS

| | | | |
|---|---|---|---|
| 3,050,587 | 8/1962 | Carbrey | 307—259 X |
| 3,098,214 | 7/1963 | Windes et al. | 307—243 X |

OTHER REFERENCES

Chisholm et al.: A Multichannel PAM-FM Radio Telemetering System, January 1951, pp. 36–43, Proc. of the IRE.

ALFRED L. BRODY, Primary Examiner

U.S. Cl. X.R.

179—15; 307—243, 257, 259; 325—38; 328—117, 154, 104; 332—40